Patented July 19, 1932

1,868,206

UNITED STATES PATENT OFFICE

RALPH M. HUNTER AND LOUIS E. WARD, OF MIDLAND, MICHIGAN, ASSIGNORS TO THE DOW CHEMICAL COMPANY, OF MIDLAND, MICHIGAN, A CORPORATION OF MICHIGAN

TREATING ELECTRODES

No Drawing.      Application filed June 16, 1930. Serial No. 461,632.

The present invention is concerned with the treating of porous electrodes to make same less porous and more durable, and is applicable to the treatment of carbon or graphitized carbon electrodes or electrodes of graphitic material to be used in the electrolysis of aqueous baths, e. g. electrolysis of a sodium chloride solution for the production of caustic soda and chlorine.

Various methods of treating such electrodes have been proposed, among which may be mentioned the impregnation with an oil, a wax, or other suitable material. Among the purposes of such impregnation is the filling of the pores to prevent or diminish the diffusion of electrolyte into or through the electrode, whereby excessive wear due to oxidation is eliminated, and when a bi-polar electrode is used the intermixture of anodic and cathodic products is controlled, while corrosion of contacts is controlled when a unipolar electrode is used. With such treatment the life of the electrode, as an anode, is materially increased.

We have invented an improvement in the treatment of electrodes, particularly adapted to the treatment of carbon or graphitized carbon electrodes used in the production of caustic alkali and chlorine, whereby the advantages heretofore gained by impregnation are markedly increased.

To the accomplishment of the foregoing and related ends, the invention then consists of the steps hereinafter fully described and particularly pointed out in the claims, the following description setting forth in detail one mode of carrying out the invention, such disclosed mode illustrating, however, but one of various ways in which the principle of the invention may be used.

Our method of treatment comprises, briefly, the impregnation of a carbon or graphitized carbon electrode with oil, such as China wood oil, followed by the exposure of the so impregnated electrode to substantially dry chlorine gas. In carrying out our improved method we charge the electrodes into a vessel which may be evacuated and which is also adapted to withstand internal pressure. It is convenient to use any of the customary types of so called impregnator vessels. We then evacuate the vessel to remove the air or other gases from the pores of the electrodes. China wood oil is then introduced into the vessel so that the electrodes are completely submerged therein, and pressure is applied to force the oil into the pores of the electrodes. After the electrodes have been thoroughly impregnated, the oil is drawn off and a vacuum is again put upon the container to assist in the drainage of excess oil. The vacuum is then released and the impregnated electrodes are removed and charged into a vessel and therein subjected to the action of a current of substantially dry chlorine gas. After a sufficient period of exposure the gas is shut off, and the electrodes removed from the vessel. A sticky coating is formed upon the surface of the electrodes, which hardens when exposed to the air, and in order to clean the surface the electrodes may be scraped, wire brushed, buffed or treated with an alkaline bath. The aforesaid treatment may be repeated one or more times, if required, to produce the desired degree of impermeability in the treated electrode. The final result is to produce a chlorinated oil-impregnated electrode which we find by use in the electrolysis of a salt solution for the production of caustic soda and chlorine to have a markedly longer useful life than a like electrode which has been similarly impregnated but not chlorinated.

We find that the temperature of impregnation, using China wood oil, will advisedly be kept below the temperature of polymerization thereof. In practice, we use a temperature within the range of 30° to 75° C. We find that the duration of the pressure stage in the oil impregnation step may be in the neighborhood of 4 to 8 hours, the exact time varying with the size and specific structural characteristics of the material being impregnated. A pressure of approximately 90 pounds has been found satisfactory, although a higher or lower pressure may be used, if so desired.

The chlorination of the oil-impregnated electrodes in an aqueous salt solution under conditions that obtain in the anode compartment of an active caustic soda- chlorine-electrolytic cell does not give the same result. Although there is a substantial action between the chlorine gas and the oil of the oil impregnated electrodes under the conditions just stated, yet the result obtained thereby is inferior and unsatsifactory as compared to that obtained in our method, as will be hereinafter shown.

*Example*

100 pounds Acheson graphitized carbon electrodes were charged into a cylindrical impregnator which was then closed and evacuated by means of a pump to a pressure of about 1 pound per square inch absolute pressure and held at that pressure for about one hour. While the connection to the vacuum pump was still open, China wood oil was admitted and after the oil had covered the electrodes the vacuum connection was closed and more oil was forced in under a pressure of about 90 pounds. This oil pressure was then held at approximately 90 pounds per square inch gauge for about 8 hours. The oil was then drawn off and the impregnator again evacuated to an absolute pressure of about 1 pound. Upon releasing the vacuum the excess oil which had been drained away from the electrodes was removed. The particular lot of electrodes treated took up approximately 8 per cent. by weight of oil relative to the weight of the untreated electrodes. The so impregnated electrodes were then transferred to a chlorinating vessel comprising a cylinder connected to a pipe line through which dry chlorine was passing so that a stream of the chlorine could be also by-passed through the chlorination vessel. The chlorine had been dried over sulphuric acid. The vessel was closed and the chlorine was passed through it for about 40 days whereupon the chlorine supply was cut off and the electrodes removed. After chlorination the electrodes were covered with a sticky film which was found to harden upon exposure to air. Some of the electrodes were scraped to remove the coating, others were washed with a solution of caustic cell liquor containing about 10 per cent. NaOH to remove the surface coating. The so treated and cleaned electrodes were employed in electrolytic chlorine cells of the bi-polar type alongside of other cells having like electrodes which had also been impregnated with China wood oil, but had not been chlorinated. The cells containing the chlorinated electrodes gave superior service and the life of the chlorine-treated electrodes was found to be approximately 50 per cent. greater than that of the unchlorinated ones.

Not only was the service life of the prechlorinated electrode greater, but there was experienced far less trouble in the cell operation using them. The cells containing the merely impregnated electrodes developed diaphragm troubles due to oil oozing cut of the electrodes and fouling the diaphragm. Such action was substantially absent in the cells using the prechlorinated electrodes.

The length of time of treatment of the oil-impregnated electrodes may be materially varied from the period given in the above example. The physical properties of the electrodes, i. e. shape, size, porosity, etc., and the particular type of oil or mixture of oils used, largely determine the time of exposure to the chlorine gas to effect a desired result. In general, a lengthening of the time of chlorination, correspondingly increases the useful life of the electrodes in service. By scraping or cleaning the oil-impregnated electrodes after partial chlorination and subsequently repeating the chlorination in some cases a superior result may be obtained.

We have illustrated the use of our invention employing China wood oil, but we wish it distinctly understood that other drying oils, such as linseed oil, cottonseed oil, or a mixture of oils comprising the same, which by reaction with chlorine will more effectively close the pores in the electrode, may be employed. Oils containing unsaturated compounds or oils mixed with diluents or with chlorination accelerating agents are also suitable to be used.

Other modes of applying the principle of our invention may be employed instead of the one explained, change being made as regards the method herein disclosed provided the step or steps stated by any of the following claims or the equivalent of such stated step or steps be employed.

We therefore particularly point out and distinctly claim as our invention:—

1. In a method of treating carbon or graphitized carbon electrodes, the steps which consist in impregnating said electrodes with a drying oil and then exposing the so impregnated electrodes to substantially dry chlorine gas.

2. In a method of treating carbon or graphitized carbon electrodes, the steps which consist in impregnating said electrodes with China wood oil and then subjecting the so treated electrodes to the action of substantially dry chlorine gas.

3. The method of treating carbon or graphitized carbon electrodes which comprises evacuating air from the pores thereof, impregnating the same with a drying oil under pressure, draining off surplus oil and subjecting the impregnated electrodes to the action of substantially dry chlorine gas.

4. The method of treating carbon or graphitized electrodes which comprises evacuating air from the pores thereof, impregnating the same with China wood oil under super-atmospheric pressure at a temperature approximately between 30° and 75° C., draining off surplus oil and subjecting the impregnated electrodes to the action of substantially dry chlorine gas.

Signed by us this 13th day of June, 1930.

RALPH M. HUNTER.
LOUIS E. WARD.